April 9, 1946.　　　R. R. McGREGOR ET AL　　　2,398,187
HYDRAULIC FLUID
Filed June 11, 1943　　　4 Sheets-Sheet 1

Inventors
ROB ROY McGREGOR
AND EARL LEATHEN WARRICK
By
Attorney

April 9, 1946.    R. R. McGREGOR ET AL    2,398,187
HYDRAULIC FLUID
Filed June 11, 1943    4 Sheets-Sheet 2

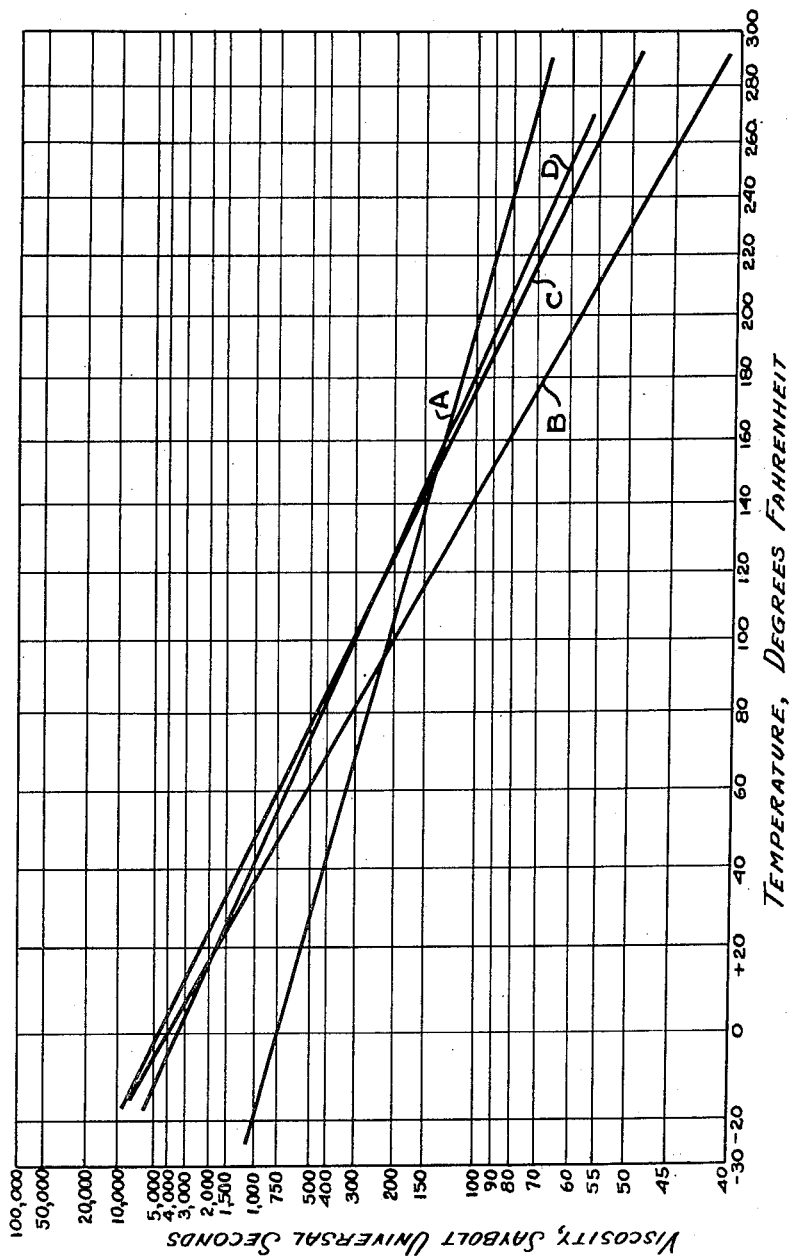

Patented Apr. 9, 1946

2,398,187

UNITED STATES PATENT OFFICE 2,398,187

HYDRAULIC FLUID

Rob Roy McGregor, Verona, and Earl Leathen Warrick, Pittsburgh, Pa., assignors to Corning Glass Works, Corning, N. Y., a corporation of New York Application June 11, 1943, Serial No. 490,520

20 Claims. (Cl. 252—78)

This invention relates to compositions of matter and more particularly to fluids for use in hydraulic machinery for the transmission and absorption of power, such as shock absorbers, brake mechanisms, artillery recoil mechanisms, lifting jacks, door checks, etc.

This invention is a continuation-in-part of our co-pending application Serial Number 432,530, filed February 26, 1942 now Patent No. 2,384,384 and assigned to the assignee of the present invention.

Certain properties are required of fluids which are to be successfully employed as pressure transmitting or absorbing media. They must be stable both chemically and physically. They must not react with the materials of which the container or exposed parts are composed, that is, they must not cause corrosion of exposed metal parts or effect any substantial swelling of rubber parts. In addition, the viscosity of such fluids should remain within workable limits over a widge range of temperature and should not display any tendency to gasify or solidify under higher and lower temperatures respectively.

The primary object of this invention is to provide pressure transmission fluids which meet the above requirements and which are characterized by having a wide range of usefulness under extremely variable operation conditions.

For a fuller understanding of the nature and objects of the invention, reference may be had to the following detailed description, taken in conjunction with the accompanying drawings, in which Fig. 1 is a viscosity-temperature chart of high polymeric dimethyl silicone fluids of different intrinsic viscosities as indicated;

Fig. 4 shows the viscosity-temperatures slopes of certain liquid silicones of our invention.

Figure 1:
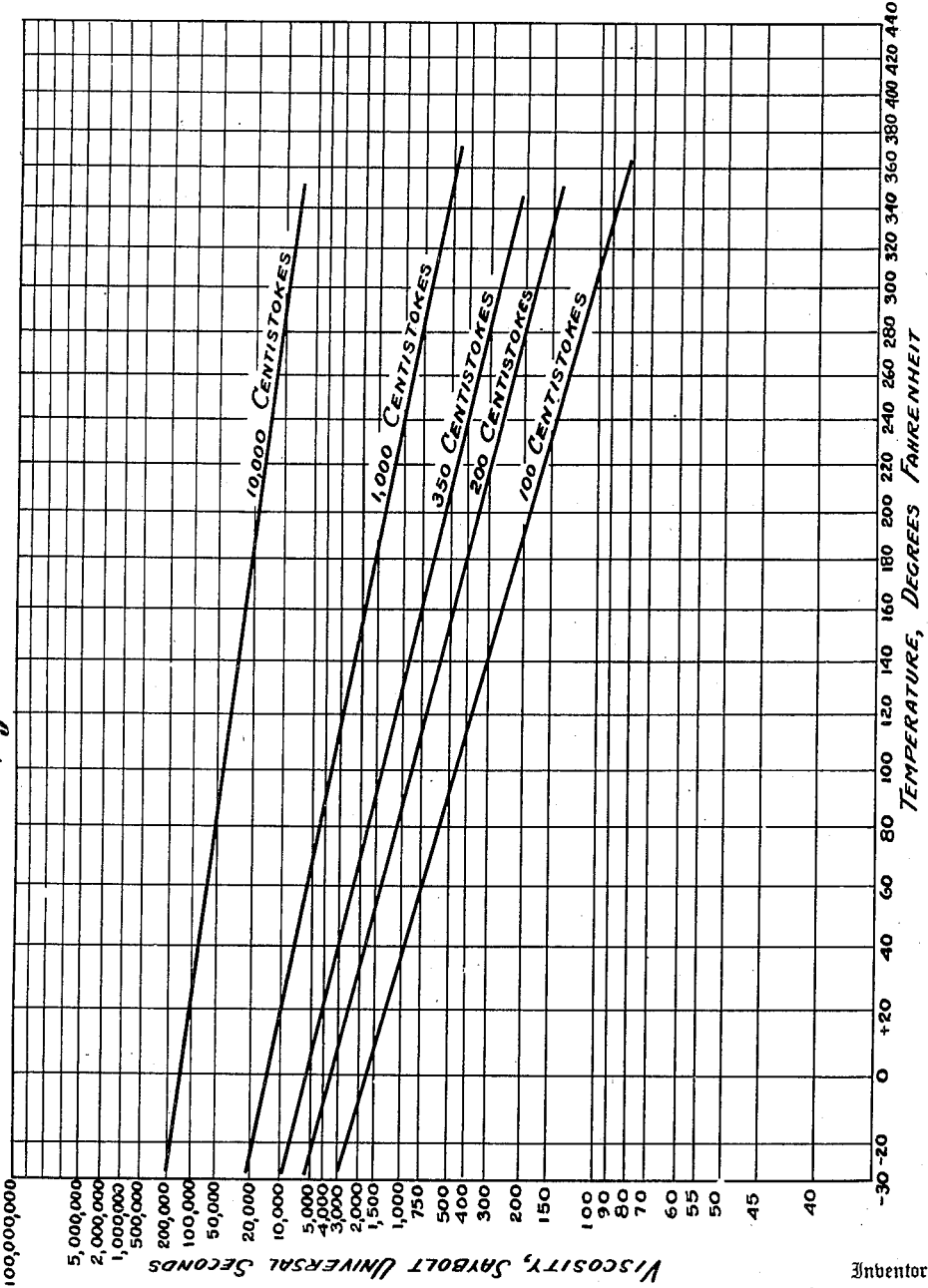

We have discovered that liquid organo-silicon oxide polymers possess properties which make them particularly suitable as hydraulic fluids per se or as constituents of fluid pressure media. They are characterized by: relatively slight changes in viscosity over a wide range of temperature; low pour points; high flash points; low volatility; low hygroscopicity; little or no corrosive or decomposing effect upon metal and rubber; and little or no gasification or solidification tendencies under the higher or lower temperature conditions encountered in the various types of hydraulic applications. They also show little or no tendency to be harmfully affected by mechanical agitation.

The liquid organo-silicon polymers with which our invention is concerned are compounds which contain organic radicals attached to silicon through a carbon atom and whose silicon atoms are joined to other silicon atoms by oxygen atoms, thus Si-O-Si. They may be prepared either by hydrolysis of hydrolyzable organo-silicanes and condensation of the hydrolysis products or by hydrolysis of a mixture of different hydrolyzable organo-silicanes and co-condensation of the hydrolysis products. By hydrolyzable organo-silicanes, we mean derivatives of $SiH_4$ having the general formula $R_ySiX_{(4-y)}$ where X is a hydrolyzable group as for example, halogen, amino, alkoxy, aroxy, acyloxy, $y$ is 1, 2, or 3 and R is an organic radical joined through one of its carbon atoms to the silicon atom. Examples of such organic radicals are as follows: methyl, ethyl, propyl, isopropyl, butyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di-, and tri-ethyl phenyls, mono-, di-, and tri-propyl phenyls, etc.; naphthyl, mono- and poly-alkyl naphthyls as methyl naphthyl, diethyl naphthyls, tri-propyl naphthyl, etc.; tetrahydronaphthyl, anthracyl, etc.; aralkyl such as benzyl, phenylethyl, etc.; alkenyl such as methallyl, allyl, etc. The above organic radicals may also contain inorganic substituents such as halogens, etc.

Such organo-silicanes may be converted to the liquid organo-silicon oxide polymers by hydrolysis and condensation in the presence of an acid catalyst as described in our co-pending application Serial Number 432,530 filed February 26, 1942, now Patent No. 2,384,384 although other methods may be employed. Organo-silicon oxide polymers may be obtained from pure compounds of the formula $R_2SiX_2$ which are mixtures of a variety of molecular sizes, and the distribution in favor of higher or lower molecular sizes, on the average, will depend upon the hydrolysis conditions, kind and percentage of catalyst used, and the diluent employed.

We may also prepare liquid organo-silicon oxide polymers by cohydrolysis and condensation of two molecular species of hydrolyzable organo-silicanes, as for example $R_ySiX_{4-y}$ and $R_{y'}SiX_{(4-y')}$ where R may be the same or different organic radical joined to silicon through carbon, X the hydrolyzable radicals referred to above and $y$ and $y'$ are 1, 2, or 3. We prefer, in such co-polymers, that the sum of $y$ and $y'$ be not less than 1.75. When $y$ and/or $y'$ is 3, simple ethers of the type $R_3SiOSiR_3$ result. In such ethers, the R groups may be the same or different, and they may be symmetrically or unsymmetrically substituted, as, for example, $R'R_2SiOSiR'R_2$ or $R_3SiOSiR'_3$.

The condensed hydrolysis products of silicanes or mixtures thereof and their polymerized products are now known as siloxanes (see page 20 of Alfred Stock's book Hydrides of Boron and Silicon, published 1933). This invention, as shown above, is concerned with the organo-substituted siloxanes, that is, those siloxanes containing organic radicals attached to silicon through carbon-silicon linkages.

We have found that for use as pressure transmitting or absorbing media those liquid organo-siloxanes which are substantially completely condensed are to be preferred for most hydraulic applications since they are thermally most stable. However, even the partially condensed liquid organo-siloxanes may be useful for certain applications where the temperature does not rise high enough to promote further condensation or polymerization. Furthermore, the use of stabilizers such as p-amino-phenol, mono-benzyl-p-aminophenol, α-naphthol, β-naphthol, dibenzyl-p-amino-phenol, pyrogallol, diphenylamine, etc., has been found effective in preventing the further polymerization of the unstable organo-siloxanes.

Although the above described liquid organo-siloxanes are admirably fitted by themselves for hydraulic fluid purposes, we have found that they may also be used in admixture or combination with one or more organic diluents. If desired, the liquid organo-siloxanes may also be added to standard hydraulic fluids or to organic lubricants in varying proportions depending on the properties desired. When added to these liquids, organic diluents may also be employed.

As examples of representative hydraulic fluids of this invention, we have found that the following liquid organo-siloxanes have highly desirable characteristics.

EXAMPLE 1

Polymeric liquid dimethyl silicones resulting from the hydrolysis of dimethyldiethoxysilicane as described in my copending application, Serial Number 432,530 filed February 26, 1942, now Patent No. 2,384,384, are freed from lower polymeric materials by distilling under 10 mm. pressure with $CO_2$ blowing through until the temperature of the residual liquid in the still reaches 250° C. At this point, substantially all the volatile material is found to be removed and the flash point by the open cup method is higher than 600° F., usually about 630° F. The residual high polymeric liquid dimethyl silicones are allowed to cool under vacuum, and filtered. The liquids so obtained are colorless, odorless, and inert. They are without corrosive effect on metals and do not swell or deteriorate rubber, or synthetic rubber gasketing or tubing materials. Liquids of varying intrinsic viscosity may be obtained to suit the individual application of hydraulic fluid, as shown in Fig. 1. All liquid dimethyl silicones prepared by hydrolysis of substantially pure $$(CH_3)_2Si(OEt)_2$$

have the same melting temperature, namely, about −40° C. although they may be supercooled as low as −60° C. without solidifying.

The principal characteristics which adapt these high polymeric liquid dimethyl silicones to use in aircraft hydraulic fluids are their low rate of change of viscosity with change of temperature, their low solidification temperature, their inertness to metals, rubber and other construction materials over the temperature range used, and their high flash point and low volatility.

In the following table, a comparison of viscosity-temperature behavior of liquid high polymeric dimethyl silicones with high grade hydraulic oils from petroleum base having equivalent viscosities at 100° F. is shown; viscosities are given in Saybolt Universal Seconds at temperature listed.

Table I

Figure 2:
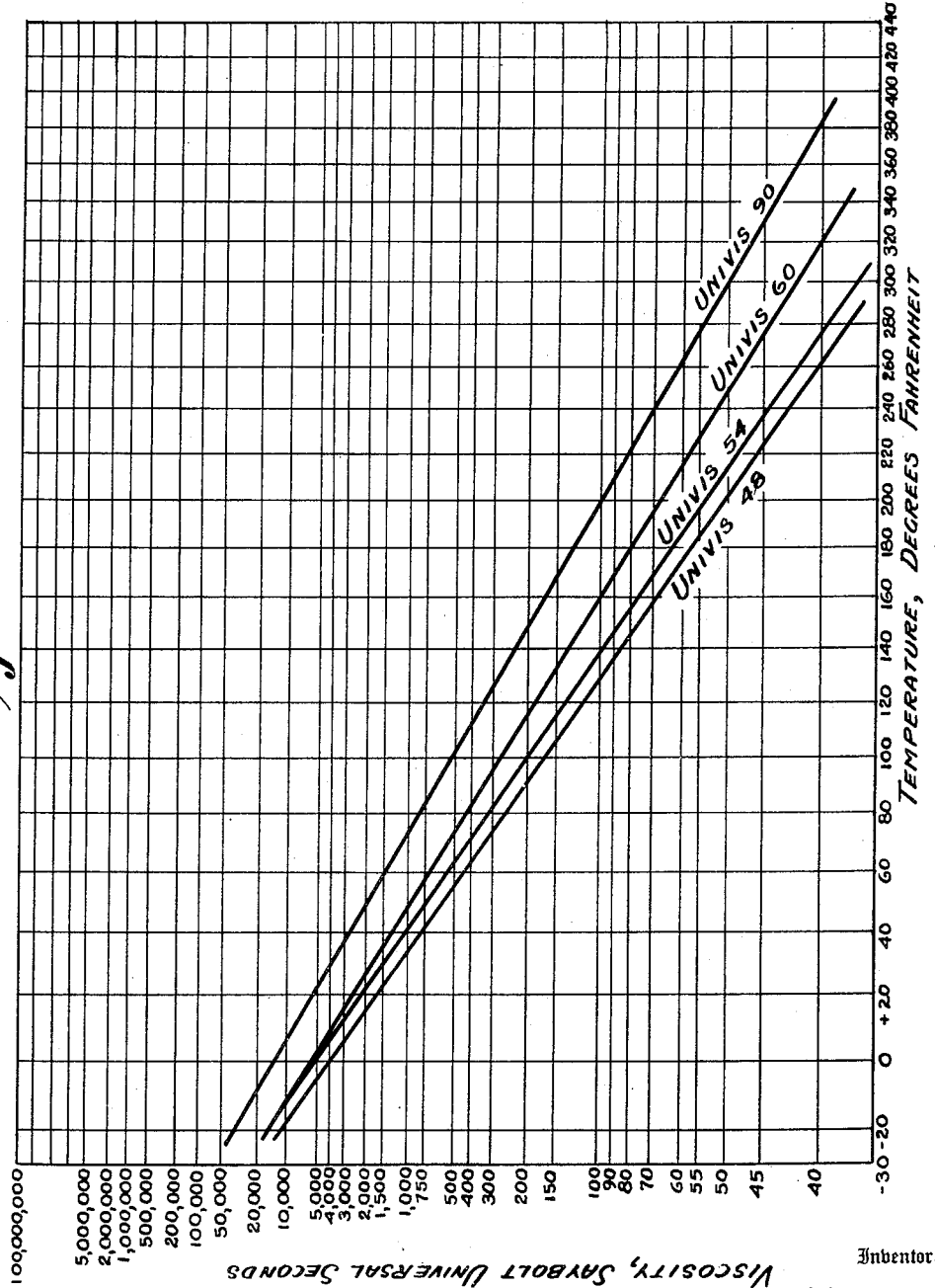
Fig. 2 shows for purpose of comparison the viscosity-temperature slopes of a series of high grade hydraulic oils sold under the trade name of "Univis"

| Temp., °F. | Dimethyl silicone 100 centistokes at 25° C., see Fig. 1 | Petroleum base hydraulic fluid (Univis 90), see Fig. 2 |
| --- | --- | --- |
| 210 | 175 | 90 |
| 100 | 440 | 500 |
| 0 | 1,550 | 1,500 |
| −22 | 2,000 | 45,000 |
| −40 | 3,200 | 270,000 |

In aircraft hydraulic fluids, this low rate of change of viscosity with temperature is essential since fluid pressure devices must operate smoothly after standing in cold climates or on changing suddenly from high altitudes where the temperature may go as low as −40° F to low altitudes where the temperature may be as high as +110° F. Under tropical flight conditions, where high temperatures are accompanied by high humidities, the insolubility of the liquid high polymeric organo-siloxanes in water and their ability to prevent access of water to surfaces with which they have been in contact is important, since prevention of access of moisture avoids clogging the apparatus by freezing out at high altitudes.

EXAMPLE 2

Liquids resulting from the cohydrolysis of 90 mole equivalents of $(CH_3)_2Si(OEt)_2$ and 10 mole equivalents of $(CH_3)Si(OEt)_3$ are distilled to a pot temperature of 250° C. under 10 mm. to remove low polymers as described in Example 1. Such liquids have approximately the empirical formula

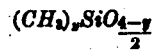
$$(CH_3)_ySiO_{\frac{4-y}{2}}$$

where $y=1.9$. As in the pure dimethyl silicones of Example 1, they may also be produced in a range of intrinsic viscosities as shown by the viscosity-temperature curves of several such polymers in Fig. 3. The intrinsic viscosities of these liquid mono-methyl-dimethyl siloxane copolymers are, in general, lower than those obtainable from dimethyl silicone polymers, and their other properties are quite similar. However, they possess even lower freezing points and melt at −85° C.

A comparison of the viscosity of high polymeric liquid siloxanes having a ratio of 1.9 methyl groups per silicon with the viscosity of a high grade hydraulic oil from a petroleum base is given in the following table.

Table II

Figure 3:
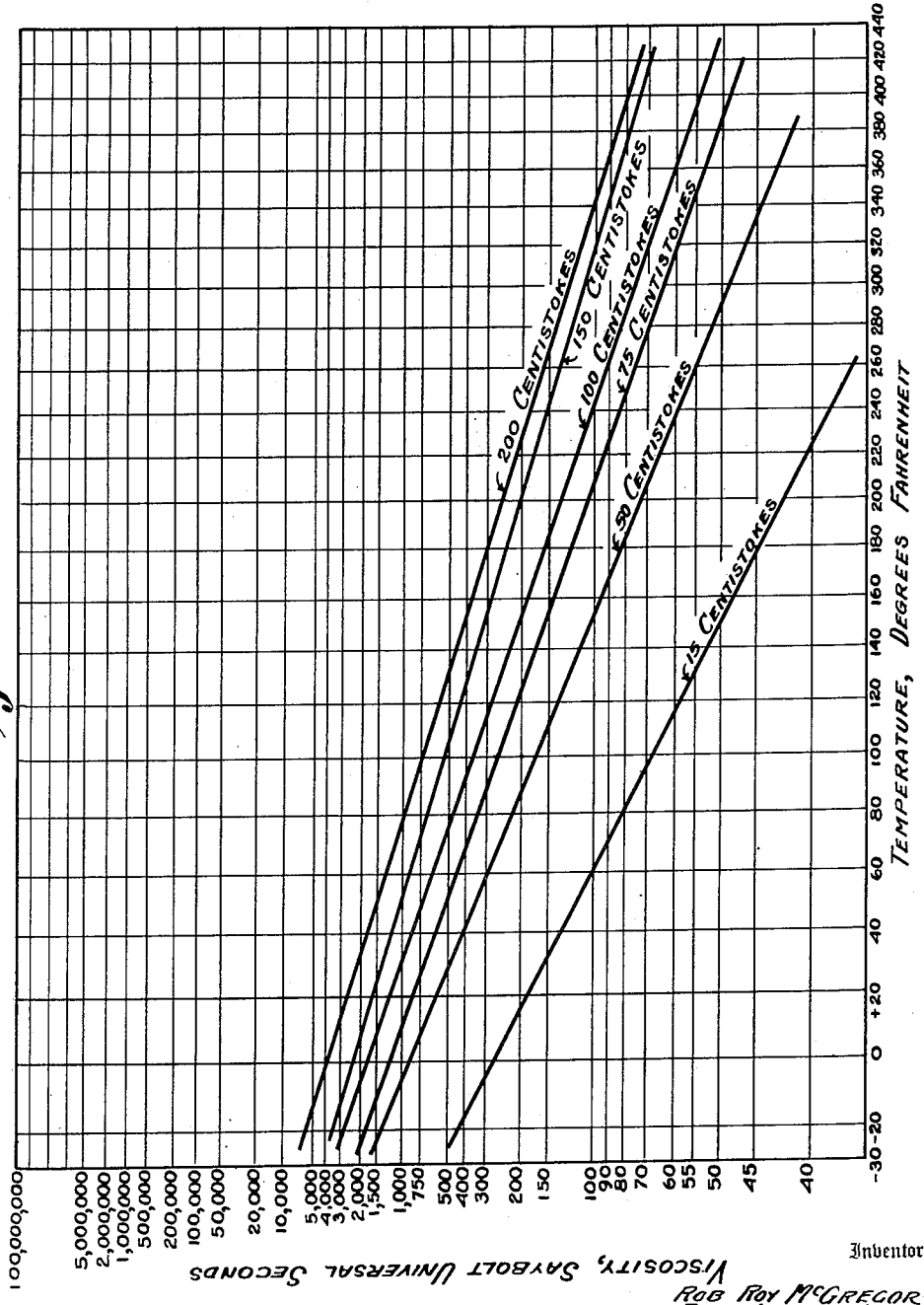
Fig. 3 is a viscosity-temperature chart of high polymeric liquid methyl silicones having a carbon to silicon ratio of 1.90 and having different intrinsic viscosities as indicated.

| Temp., °F. | Methyl siloxane fluid (50 cs), see Fig. 3 | Petroleum base hydraulic oil (Univis 40), see Fig. 2 |
| --- | --- | --- |
| 210 | 68 | 45 |
| 100 | 170 | 165 |
| 0 | 900 | 5,800 |
| −22 | 1,500 | 15,000 |
| −40 | 2,400 | 60,000 |

EXAMPLE 3

Liquid copolymers resulting from the hydrolysis of a mixture of 3 mole equivalents of $$(CH_3)_3Si(OEt)$$

with 97 mole equivalents of $(CH_3)_2Si(OEt)_2$ were distilled up to 250° C. still temperature under 25 mm. pressure. The residual high polymeric oil was cooled, filtered and had a viscosity of 58 centistokes at 25° C. and a flash point of 385° F. It had all the properties of the dimethyl oils for hydraulic fluids but would not freeze on exposure to temperatures of solid carbon dioxide.

A comparison of the viscosity of this high polymeric liquid methyl siloxane with a high grade petroleum base hydraulic oil is given in the table below in Saybolt Universal seconds.

*Table III*

| Temp., °F. | Methyl siloxane fluid (see A, Fig. 4) | Petroleum base hydraulic oil (Univis 54) (see fig. 2) |
|---|---|---|
| 210 | 92 | 51.5 |
| 100 | 220 | 200 |
| 0 | 750 | 6,000 |
| −22 | 1,050 | 19,500 |
| −40 | 1,500 | 65,000 |

EXAMPLE 4

In a manner entirely similar to Example 1 of this application and as described in our pending application Serial Number 432,530 filed February 26, 1942, now Patent No. 2,384,384 diethyl diethoxy silicane was hydrolyzed and converted to a high polymeric hydraulic fluid. This material is also characterized by a low rate of change of viscosity with temperature and the inertness of the materials of the preceeding examples. A comparison of the viscosity of the high polymeric silicone with the viscosity of a high grade hydraulic oil from a petroleum base is given in the following table where the viscosities are in Saybolt Universal seconds.

*Table IV*

| Temp., °F. | Diethyl silicone (see B, Fig. 4) | Petroleum base hydraulic oil (Univis 48) (see Fig. 2) |
|---|---|---|
| 210 | 50 | 48 |
| 100 | 175 | 165 |
| 0 | 4,000 | 5,800 |
| −22 | 12,000 | 16,000 |

EXAMPLE 5

A liquid copolymeric siloxane containing 10 mole per cent of the structural unit $$(C_6H_5)-Si-O$$
$$|$$
$$(C_2H_5)$$

and 90 mole per cent of the structural unit $$CH_3Si-O$$
$$|$$
$$CH_3$$

has a solidification temperature of −55° C. and a temperature-viscosity slope of 1410 from 0° C. to 100° C. (the slope being the value of the quotient $$\frac{\Delta \log N}{\Delta \log 1/T}$$

where N is viscosity and T the absolute temperature) as contrasted with a solidification temperature of −19° C. and a temperature-viscosity slope of over 2000 for "Gulf Pride 40," a standard hydraulic fluid. The viscosity of this siloxane at 0° C. was 350 centistokes. Its chemical properties are similar to those of the methyl siloxanes discussed above.

EXAMPLE 6

A liquid copolymeric siloxane containing 10 mole per cent of the structural unit $$(C_5H_{11})-Si-O$$
$$|$$
$$(C_5H_{11})$$

and 90 mole per cent of the structural unit $$(CH_3)SiO$$
$$|$$
$$CH_3$$

has a solidification temperature of −45° C. and a temperature-viscosity slope of 1300 from 0° C. to 100° C. At 0° C. this siloxane had a viscosity of 285 centistokes. Its chemical properties correspond with those of the methyl siloxanes. A comparison of the viscosity of the copolymers described in Examples 5 and 6 with that of a petroleum base hydraulic oil is given in the table below where viscosities are in Saybolt Universal seconds.

*Table V*

| Temp., °F. | PhEtSio-Me₂SiO copolymer Ex. 5 (see C, Fig. 4) | Am₂Sio-Me₂SiO copolymer Ex. 6 (see D, Fig. 4) | Petroleum base hydraulic oil (Univis 60) (see Fig. 2) |
|---|---|---|---|
| 210 | 75 | 80 | 62 |
| 100 | 320 | 300 | 260 |
| 0 | 4,600 | 3,400 | 7,500 |
| −22 | 11,000 | 7,000 | 65,000 |

EXAMPLE 7

The siloxane $[(C_6H_5)(CH_3)_2Si]_2O$ known as bis-phenyl-dimethylsilicyl oxide is a liquid having a solidification temperature of −76° C. and a temperature-viscosity slope of 1280 from 0° C. to 100° C. Like most of the completely organo-substituted disiloxanes it is highly resistant to further polymerization. In general, siloxanes of this type (i. e. the completely substituted disiloxanes) possess properties which especially adapt them for use as hydraulic fluids.

The liquid organo-siloxanes of our invention are eminently adapted to be used as pressure transmitting or absorbing media in hydraulic machinery and similar mechanism which depend for their successful operation on the constancy of resistance to flow through small orifices offered by a viscous liquid under various conditions. One of the outstanding advantages of the liquid organo-siloxanes as hydraulic media is the wide variation in viscosity attainable in a given composition by controlling the extent of polymerization so that a given organo-siloxane may be used in a variety of hydraulic applications requiring liquids of different viscosities. In this regard, liquid organo-siloxanes have been prepared ranging in viscosity from 1½ centistokes up to over 100,000 centistokes. Examples of the various types of hydraulic applications for which these organo-siloxanes are fitted are hydraulic pressure actuating mechanisms, hydraulic clutches, shock absorbers, dash pots, vibration dampeners, artillery recoil mechanisms, lifting jacks, door checks, etc., i. e. in general, hydraulic apparatus wherein a liquid is utilized to effect relative movement of a member such as a piston and an enclosing chamber.

We claim:

1. In the process of effecting movement of a movable member within an enclosing chamber, the step which consists in transmitting pressure to said movable member through a homogeneous liquid medium, the major constituent of which is a liquid organo-siloxane whose organic substituents consist essentially of organic radicals attached to silicon through carbon-silicon linkages, at least some of said organic radicals being alkyl radicals containing less than three carbon atoms.

2. In the process of effecting movement of a movable member within an enclosing chamber, the step which consists in transmitting pressure to said movable member through a homogeneous liquid medium, the major constituent of which is a liquid organo-siloxane whose organic substituents consist essentially of organic radicals attached to silicon through carbon-silicon linkages at least some of said organic radicals being alkyl radicals containing less than three carbon atoms, and the remainder of the liquid medium being an organic lubricant.

3. In the process of effecting movement of a movable member within an enclosing chamber, the step which consists in transmitting pressure to said movable member through a liquid medium consisting essentially of a substantially completely condensed liquid organo-siloxane whose organic substituents consist essentially of monovalent hydrocarbon radicals attached to silicon through carbon-silicon linkages, at least some of said hydrocarbon radicals being alkyl radicals containing less than three carbon atoms.

4. The process according to claim 3 wherein the liquid organo-siloxane is completely condensed and wherein the hydrocarbon radicals are principally alkyl radicals having less than three carbon atoms.

5. The process according to claim 3 wherein the hydrocarbon radicals consist of alkyl radicals having less than three carbon atoms and aryl radicals.

6. The process according to claim 3 wherein the hydrocarbon radicals consist of alkyl radicals having less than three carbon atoms and phenyl radicals.

7. The process according to claim 3 wherein the hydrocarbon radicals consist of alkyl radicals having less than three carbon atoms.

8. The process according to claim 3 wherein the hydrocarbon radicals consist of methyl radicals.

9. The process according to claim 3 wherein the liquid organo-siloxane is liquid dimethyl silicone.

10. The process according to claim 3 where the liquid organo-siloxane is liquid dimethyl silicone which is substantially non-volatile below 250° C. at 10 mm. pressure and which has a freezing point below −40° C.

11. The process according to claim 3 wherein the liquid organo-siloxane is liquid diethyl silicone.

12. The process according to claim 3 wherein the liquid organo-siloxane is bis-phenyldimethylsilicyl oxide.

13. Hydraulic apparatus comprising, in combination, a movable member and a liquid medium arranged in contact with said member, said liquid medium consisting of a liquid organo-siloxane whose organic substituents consist essentially of monovalent hydrocarbon radicals attached to silicon through carbon-silicon linkages, at least some of said hydrocarbon radicals being alkyl radicals having less than three carbon atoms.

14. Hydraulic apparatus comprising, in combination, a movable member and a liquid medium arranged in contact with said member, said liquid medium consisting of a substantially completely condensed liquid organo-siloxane whose organic substituents consist essentially of monovalent hydrocarbon radicals attached to silicon through carbon-silicon linkages, at least some of said hydrocarbon radicals being alkyl radicals having less than three carbon atoms.

15. Hydraulic apparatus comprising, in combination, a movable member and a liquid medium arranged in contact with said member, said liquid medium consisting of a substantially completely condensed liquid organo-siloxane whose organic substituents consist essentially of alkyl radicals having less than three carbon atoms and phenyl radicals attached to silicon through carbon-silicon linkages.

16. Hydraulic apparatus comprising, in combination, a movable member and a liquid medium arranged in contact with said member, said liquid medium consisting of a substantially completely condensed liquid organo-siloxane whose organic substituents consist essentially of alkyl radicals attached to silicon through carbon-silicon linkages, said alkyl radicals having less than three carbon atoms.

17. Hydraulic apparatus comprising, in combination, a movable member and a liquid medium arranged in contact with said member, said liquid medium consisting of a liquid dimethyl silicone.

18. Hydraulic apparatus comprising, in combination, a movable member and a liquid medium arranged in contact with said member, said liquid medium consisting of a liquid dimethyl silicone which is substantially non-volatile below 250° C. at 10 mm. pressure and which has a freezing point below −40° C.

19. Hydraulic apparatus comprising, in combination, a movable member and a liquid medium arranged in contact with said member, said liquid medium consisting of a liquid diethyl silicone.

20. Hydraulic apparatus comprising, in combination, a movable member and a liquid medium arranged in contact with said member, said liquid medium consisting of bis-phenyldimethylsilicyl oxide.

ROB ROY McGREGOR.
EARL LEATHEN WARRICK.